US010635671B2

(12) United States Patent
Sheng et al.

(10) Patent No.: US 10,635,671 B2
(45) Date of Patent: Apr. 28, 2020

(54) SORT-MERGE BAND JOIN OPTIMIZATION

(71) Applicant: Oracle International Corporation, Redwood Shores, CA (US)

(72) Inventors: Lei Sheng, Foster City, CA (US); Rafi Ahmed, Fremont, CA (US); Andrew Witkowski, Foster City, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 15/726,030

(22) Filed: Oct. 5, 2017

(65) Prior Publication Data

US 2018/0101573 A1 Apr. 12, 2018

Related U.S. Application Data

(60) Provisional application No. 62/404,713, filed on Oct. 5, 2016.

(51) Int. Cl.
*G06F 16/00* (2019.01)
*G06F 16/2453* (2019.01)

(52) U.S. Cl.
CPC .. *G06F 16/24544* (2019.01); *G06F 16/24537* (2019.01)

(58) Field of Classification Search
CPC ............... G06F 16/24544; G06F 16/24537
See application file for complete search history.

(56) References Cited

U.S. PATENT DOCUMENTS

| 5,598,559 | A | 1/1997 | Chaudhuri | |
|---|---|---|---|---|
| 6,185,557 | B1 * | 2/2001 | Liu | G06F 16/2456 |
| 6,804,678 | B1 * | 10/2004 | Luo | G06F 16/24532 |
| 6,944,633 | B1 * | 9/2005 | Higa | G06F 16/2471 |
| 2003/0078909 | A1 | 4/2003 | Pham | |
| 2003/0088558 | A1 | 5/2003 | Zaharioudakis | |
| 2004/0243550 | A1 * | 12/2004 | Gu | G06F 16/284 |
| 2004/0243591 | A1 * | 12/2004 | Gu | G06F 16/283 |
| 2006/0218123 | A1 * | 9/2006 | Chowdhuri | G06F 16/24532 |
| 2007/0219951 | A1 * | 9/2007 | Ahmed | G06F 16/24544 |

(Continued)

OTHER PUBLICATIONS

Shmed, U.S. Appl. No. 15/658,249, filed Jul. 24, 2017, Office Action, dated Mar. 18, 2019.

(Continued)

*Primary Examiner* — Noosha Arjomandi
(74) *Attorney, Agent, or Firm* — Hickman Palermo Becker Bingham LLP (57) ABSTRACT

Techniques herein optimize sort-merge join method for a band join. In an embodiment, for a query comprising a query block specifying a join between a first table and a second table, a band join condition is detected between the first table and the second table. Once the band join condition in detected, an execution plan is generated and executed. The execution of the execution plan includes: for a first row of at least a subset of first sorted rows, scanning second rows from a set of second sorted rows, joining each of said second rows with said first row, and ceasing to scan when encountering a row from the second sorted rows that falls outside a bound of said band join condition. Techniques also include parallelizing a workload by overlapping the distribution of rows to the same slave process and computing cost and cardinality estimation for enhanced band join.

28 Claims, 7 Drawing Sheets

(56) References Cited

U.S. PATENT DOCUMENTS

| | | | |
|---|---|---|---|
| 2008/0306903 A1* | 12/2008 | Larson | G06F 16/2462 |
| 2009/0055349 A1* | 2/2009 | Ahmed | G06F 16/24537 |
| 2009/0119247 A1* | 5/2009 | Bellamkonda, Sr. | ............... |
| | | | G06F 16/2456 |
| 2009/0299989 A1* | 12/2009 | Zhang | G06F 16/24545 |
| 2011/0282864 A1* | 11/2011 | Collins | G06F 16/24534 |
| | | | 707/719 |
| 2014/0095502 A1* | 4/2014 | Ziauddin | G06F 16/283 |
| | | | 707/737 |
| 2014/0214754 A1* | 7/2014 | Li | G06F 16/24524 |
| | | | 707/603 |
| 2014/0214799 A1* | 7/2014 | Li | G06F 16/24532 |
| | | | 707/718 |
| 2015/0134670 A1* | 5/2015 | Liu | G06F 16/20 |
| | | | 707/741 |
| 2015/0269224 A1* | 9/2015 | Kundu | G06F 16/2455 |
| | | | 707/718 |
| 2015/0293968 A1 | 10/2015 | Dickie | |
| 2016/0350347 A1* | 12/2016 | Das | G06F 16/24542 |
| 2016/0378827 A1* | 12/2016 | Bondalapati | G06F 16/24542 |
| | | | 707/718 |
| 2017/0060944 A1* | 3/2017 | Khayyat | G06F 16/24537 |
| 2017/0262496 A1* | 9/2017 | Nethery | G06F 16/2423 |
| 2018/0075102 A1 | 3/2018 | Oppenheimer | |
| 2019/0026332 A1 | 1/2019 | Ahmed | |
| 2019/0121891 A1* | 4/2019 | Fender | G06F 16/24544 |

OTHER PUBLICATIONS

Ahmed, U.S. Appl. No. 15/658,249, filed Jul. 24, 2017, Notice of Allowance, dated Jun. 12, 2019.

* cited by examiner

SORT-MERGE BAND JOIN OPTIMIZATION

CROSS-REFERENCE TO RELATED APPLICATIONS; BENEFIT CLAIM

This application claims priority to U.S. Provisional Application No. 62/404,713, filed on Oct. 5, 2016, the entire contents of which is hereby incorporated by reference as if fully set forth herein, under 35 U.S.C. § 119(e).

FIELD OF THE INVENTION

The present invention relates to database systems, and in particular, to optimization of queries executed by a database system.

BACKGROUND

Relational and object-relational database management systems store information in tables in a database. To retrieve data, queries that request data are submitted to a database server, which computes the queries and returns the data requested. Query statements submitted to the database server should conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that is optimized for efficient execution. The optimization of a data query typically involves parsing the query to understand its structure and form, and then determining an effective (and, preferably, optimal) manner in which to retrieve or access the requested data.

An execution plan may specify how to access the data, how to format it, and any other operations to be performed. Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and full outer join.

SQL supports join operations, which combine the contents of two tables. Join operations fall into two basic categories: an "equijoin" operation in which the selection criteria contains an equality condition, such as requiring a match on one or more join columns common to two tables, as opposed to "non-equijoin" operations which specify conditions other than equality. In either case, the algorithm that performs the join operation must compare each row in one table with each row in every other table designated in the join operation A band join is a non-equijoin of rows of two tables in which the join condition is a range or band rather than an equality or an open-ended inequality.

A join between tables R and S on attributes R.x and S.y is a band join if the join condition is of the form:

$R.x-B1<=S.y$ and $R.x+B2>=S.y$.

Band joins can generally be written with the "between" keyword using the syntax:

S.y between $R.x-B1$ and $R.x+B2$.

The constants B1 and B2 of the band join may be equal and one of them may be zero. Further, one or both of the relational operator may be < or > rather than <= or >=. B1+B2 is referred to as the band length or just band. The band join predicates have the property that a particular value of S.y joins only with the values of R in the interval [S.y−B2, S.y+B1], (S.y−B2, S.y+B1), [S.y−B2, S.y+B1), or (S.y−B2, S.y+B1]. That is, all values matching a particular value of R.x will fall within a band in S.y that has a length B1+B2.

Band joins may be useful in queries that involve real world domains, such as time, position, or price. For example, suppose that a user of the DBMS wants to investigate the correlation between the situation of the stock market and important company events. Two tables, PRICE and NEWS, are involved. Rows of PRICE represent the oscillation of stocks within a day, with attribute PRICE.C representing the time of the measurement in seconds. Rows of NEWS represent financial news articles events, with attribute NEWS.D representing the time in seconds that the article was released.

Suppose the user wants to find all pairs of events occurring at nearly the same time, such that the first event represents a great oscillation of a stock within a day, and the second event represents a news event that mentions the company. Such a query may use a band join. The query may be written in SQL as:

SELECT PRICE. SYMBOL, NEWS.ARTICLE, PRICE.PERCENT CHANGE
FROM PRICE, NEWS
WHERE PRICE.PERCENT CHANGE>10
AND PRICE.C−300<=NEWS.D
AND PRICE.C+300>=NEWS.D
AND NEWS.ARTICLE.CONTAINS (PRICE. SYMBOL)

One of the conditions uses a join operation, in which the difference between attribute, PRICE.C, and attribute, NEWS.D, is between −300 and 300. Rows that meet the join criteria become part of the result table for the query For band join, the join condition involves a range of values. According to various approaches, the above query is evaluated using either nested-loop or sort-merge join.

Joins on inequality predicates such as those contained in a typical band join are generally quite inefficient. If the query optimizer does not recognize the particular shape of band join predicates, band join queries may result in a very inefficient Cartesian join where many redundant operations are performed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for optimizing sort-merge joins used to process queries with a band join condition. In an embodiment, for a query comprising a query block specifying a join between a first table and a second table, a band join condition is detected between the first table and the second table. Once the band join condition in detected, an execution plan is generated and executed. The execution of the execution plan includes: for a first row of at least a subset of first sorted rows, scanning second rows from a set of second sorted rows, joining each of said second rows with said first row, and ceasing to scan when encountering a row from the second sorted rows that falls outside a bound of said band join condition.

In an embodiment, a band join condition includes an upper bound and a lower bound, and each table includes a respective column to be joined. A band join condition may be satisfied when a value in the second column falls between a lower bound and upper bound that are based on a value in the first column. An execution plan for a band join may be optimized so that during a sort-merge join, when encountering a row from the second sorted rows that falls outside the upper bound of the band of the band join condition, scanning will cease instead of continuing to scan the remainder of the rows.

Sort-Merge Join

One approach used to join rows of two tables is the "sort merge" join. A common sort merge join scans both tables in the order of the join columns. If there are no efficient indices on the join columns to provide the ordering, a sort on either table or both is required. When a row of one of the tables (the "first" table) matches a row in the other table (the "second" table) on the join columns, the sort merge join merges the two rows and returns the combined result. Then the sort merge join reads another row in the second table that might match the same row of the first table. It continues reading rows in the second table as long as there is a match. When there is no longer a match, another row from the first table is read. If the next row in the first table has the same value in the join column as the previous row in the first table, sort merge scans the rows in the second table again and returns the group of rows that matched the previous row in the first table If the next row in the first table has a different value in the join column than the previous row, the sort merge join searches the second table until it finds either (a) a row that matches the row in the first table, or (b) an row that has a join column value greater than the join column value of the row in the first table. If (a) occurs, the duplicates matching process described above is performed. If (b) occurs, the sort merge join discards the row in the first table and begins the searching process again for the row that is next in sequence in the first table.

Sort-Merge for Inequality Join

The following describes a method of performing sort-merge join on an inequality predicate without band join enhancement. When an inequality join such as a band join is specified by a query and the query optimizer has not been optimized to detect a band join between two tables, the query optimizer will choose one of the two inequality predicates specified in the WHERE clause of the query block as the join predicate and will use the other predicate as a post join filter to filter out rows that result from the first join.
SELECT e1.ename, e2.ename
FROM emp e1, emp e2
WHERE e2.sal−500 <=e1.sal and e1.sal<=e2.sal+500

The example query above represents a self-join of two tables to return pairs of employees who salaries are within 500 dollars of each other. The query specifies a band join between e1.sal and e2.sal. However, the band join is not detected. For a typical sort-merge for inequality join, the join operands, e1 and e2, are initially sorted by a sort row source, or sort plan operator. The join starts by scanning the left sorted input: for each row of the left input, it scans the sorted right input for rows satisfying the open-ended join predicate, E1.sal>=E2.sal−500. Each satisfying row is then passed to the join filter operator, and if a respective row satisfies the filter predicate E1.sal<=E2.sal+500, it is returned to the join row source. The inefficiency comes in that, when the filter row source finds that the row passed from the sort row source is no longer satisfying the filter predicate, e.g. E1.sal<=E2.sal+500, scanning of the rest of the sort on the right input does not stop and all the following rows that do not satisfy the predicate are scanned. As a result, many unnecessary operations are performed.

Thus, the sort row source will send all rows satisfying the join predicate, e.g. all rows that are greater than or equal to the lower bound of the band, to the filter row source for filtering, no matter how far outside the upper bound of the band said rows may be.

Enhancing Sort-Merge dor Band Join

Sort-merge join for band join queries can be enhanced so that once the rows scanned from the sorted right input no longer satisfy the upper bound predicate, scanning of the rest of the sorted right input will stop. In this scenario, sort merge will simply move on to join the next row from the sorted left input with the sorted right input instead of inefficiently continuing to scan the remainder of the right input.

In other approaches, for each row from the sorted left input, sort merge join will scan the sorted right input, starting from the first row that joins with the previous left row and ending at the last row in the sorted right input. With the enhanced sort-merge for band join optimization, for each row from the sorted left input, a scan of the sorted right input will start from the first row that joins with the previous left row and end at the first row that falls outside of the upper bound of the band. Thus, the band join predicates can be utilized by sort-merge join to avoid unnecessary scanning of the sorted right input when it reaches a row that falls out of the band.

To enhance sort merge for band join, during query optimization, existence of a band join is detected, as described herein. Once a band join is detected, one of the band join predicates is used for the sort merge join key along with other equality predicates. Thus, for sort merge, the join keys are formed with zero or more equality predicates followed by zero or one inequality predicate. When forming the sort keys, the join key for the inequality predicate should be placed last.

Additionally, the other band join predicate is stored in the optimizer annotation so that the band join predicate can be used to stop scanning the sorted right input during execution of a sort merge for band join.

Lastly, for cost-based optimization, cost estimation for sort merge reflects the band join optimization, as described herein.

During query execution, the upper bound predicate is set up in the sort row source allocated for the right input and the sort row source will utilize the upper bound predicate. Thus, during scanning of the sorted right input for matching rows, the row source will check whether the current row falls outside of the band. That is, the band join predicate stored in the sort row source will be evaluated and scanning terminated when the band join predicate evaluates to FALSE.

Figure 1A:
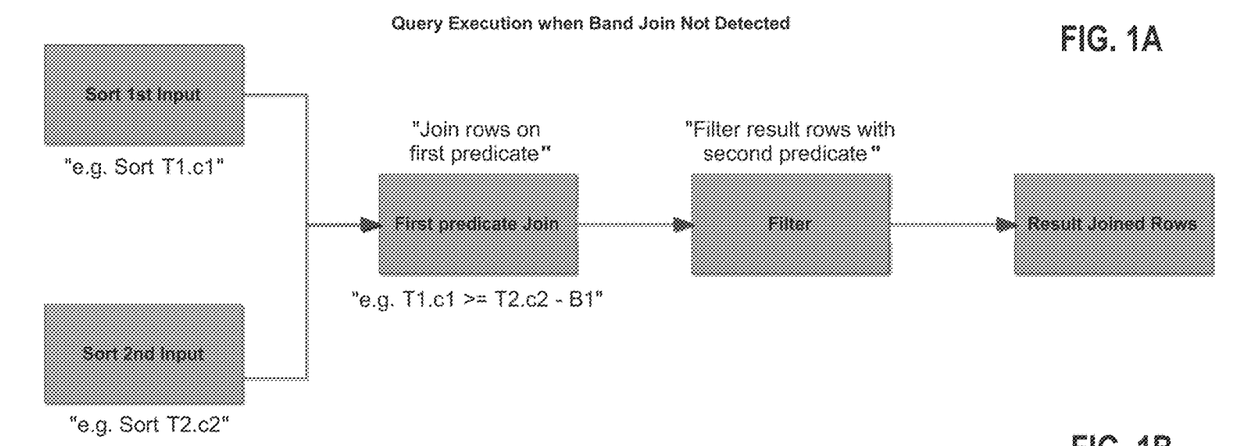
FIG. 1A is an illustration of a query execution plan when the query optimizer does not detect a band join according to an embodiment.

In FIG. 1A, for a query specifying a band join, where the optimizer does not detect a band join, each input is sorted by the respective sort row source. For example, for a band join specified as T1.c1>=T2.c2−B1 and T1.c1<=T2.c2+B2, the inputs T1.c1 and T2.c2 are each sorted by a respective sort row source. The sorted rows are then joined on the first band join predicate, and the satisfying rows are passed to a filter row source. For example, the sorted rows are joined on the predicate T1.c1>=T2.c2−B1 and then passed to the filter row source. The filter row source applies the second band join predicate, filtering out rows of which do not satisfy the condition. For example, the result rows from the first predicate join are filtered by the predicate T1.c1<=T2.c2+B2. Rows satisfying the filter condition (second band join predicate) are returned in the result.

Figure 1B:
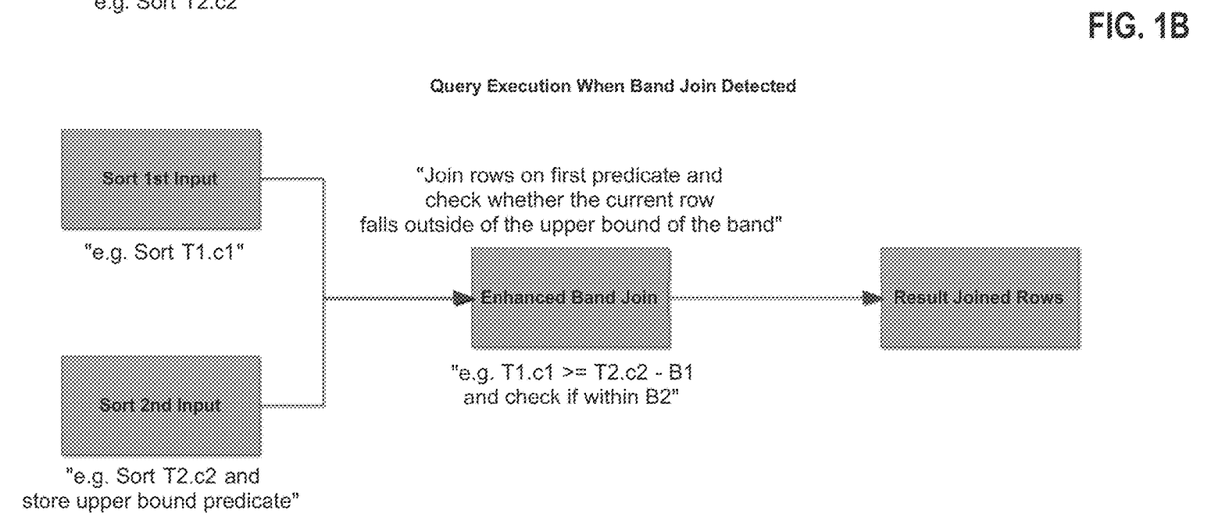
FIG. 1B is an illustration of a query execution plan when the query optimizer detects a band join according to an embodiment.

In FIG. 1B, for a query specifying a band join, where the optimizer detects a band join, each input is sorted by the respective sort row source. For example, for a band join specified as T1.c1>=T2.c2−B1 and T1.c1<=T2.c2+B2, the inputs T1.c1 and T2.c2 are each sorted by a respective sort row source. In this operation, the upper bound predicate is stored in the sort row source for the right input. The sorted rows from each input are then joined. In this step, during scanning of the sorted right input for rows that satisfy the first predicate, the row source will also check whether the current row falls outside of the upper bound of the band. That is, the band join predicate stored in the sort row source will be evaluated and scanning terminated when the band join predicate evaluates to FALSE. For example, the sorted rows are joined on the predicate T1.c1>=T2. c2−B1 and during scanning of the sorted right input for matching rows, the row source will check whether the current row falls outside of the band, B2. Rows satisfying both band join predicates are then returned.

Additionally, during query execution, enhanced sort merge for band join may be executed in parallel, as described herein.

Figure 7:
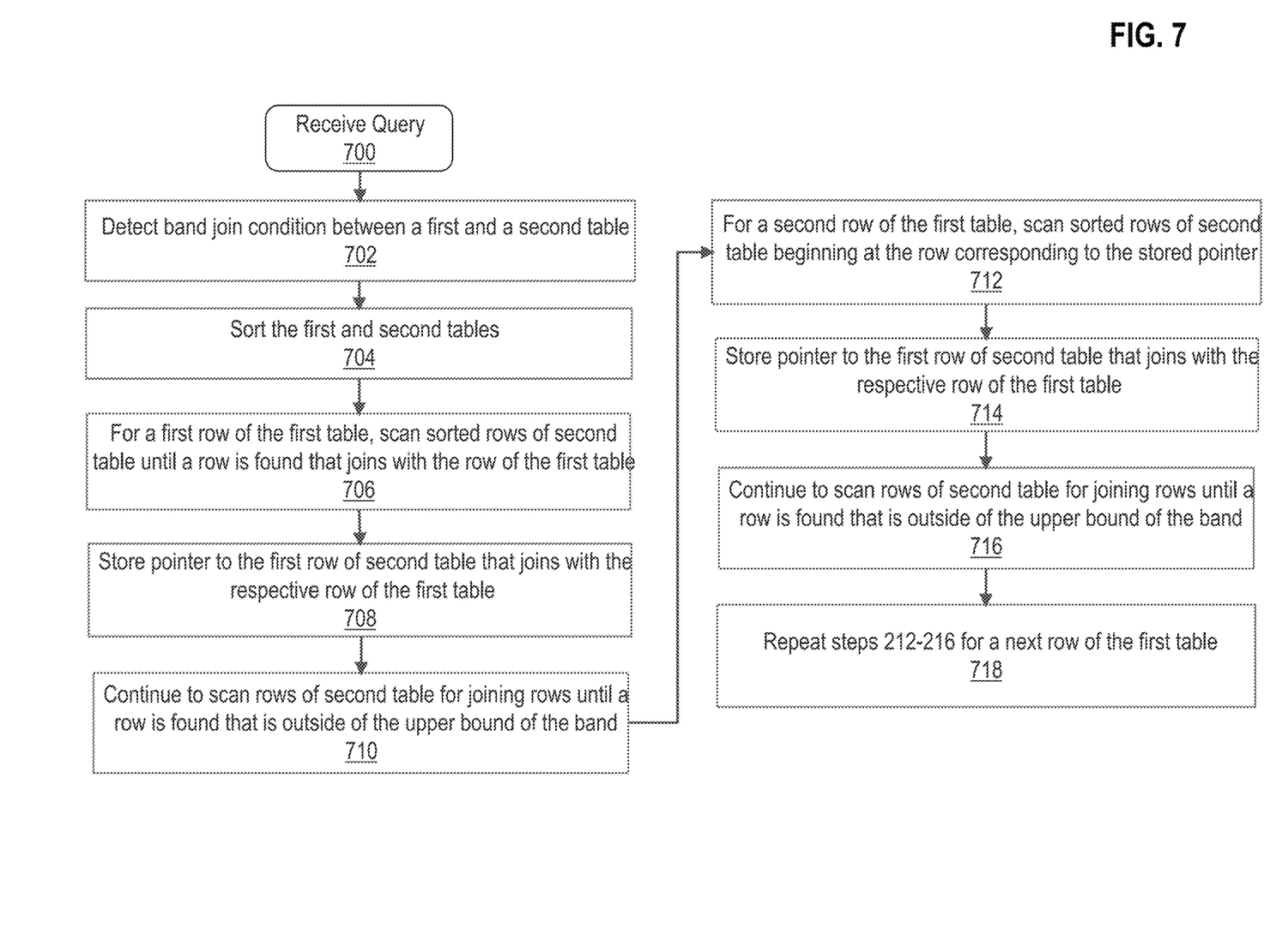
FIG. 7 is an example illustration of query execution of enhanced sort merge when band join is detected.

FIG. 7 illustrates an example process of query execution of enhanced sort merge when band join is detected. In step 700, a query is received. In step 704, a band join condition is detected between a first and second table. The band join may specify an upper and lower bound, as discussed in this paper. In step 704, the first table is sorted and the second table is sorted. In step 706, for a first row of the first table, rows of the second table are scanned until a row is found that joins with the row of the first table. In step 708, a pointer is stored that points to the first row of the second table that joins with the respective row of the first table. In step 710, the scanning of the second table for joining rows continues until a row is found in the second table that is outside of the upper bound of the band. In step 712, for a second row of the first table, rows of the second table are scanned beginning at the row corresponding to the stored pointer. In step 714, a pointer is stored that points to the first row of the second table that joins with the respective row from the first table. In step 716, the scanning of the second table for joining rows continues until a row is found that is outside the upper bound of the band. In step 718, steps 212-216 are repeated for a next row of the first table. For example, after step 716, for a third row of the first table, rows of the second table are scanned beginning at the row corresponding to the pointer stored in step 714. Steps 712-718 are repeated for each row of the first table. At a certain point during the process, a row from the first table may not join with any row inside the upper and lower bounds of the band. At this point, the processing will stop and results will be returned.

FIG. 7 is but one example process of query execution of enhanced sort merge when band join is detected and should not be interpreted as the only embodiment. Other implementations may comprise fewer or additional elements in varying arrangements.

Detecting Band Join

Given a query block, a query optimizer will check if there exists a band join between two tables, T1 and T2. The existence of the following join predicates for T1 and T2 must be satisfied.

An inequality predicate of the form: T1.c1>=T2.c2−B1
An inequality predicate of the form: T1.c1<=T2.c2+B2
Either B1 or B2 (but not both) can be zero. The relational operators can be >, >=, <, or <=.

The criteria for the join predicates for T1 and T2 is also satisfied by the following statement using the "between" keyword, if the relational operators <=and >=are used: T1.c1 between T2.c2−B1 and T2.c2+B2.

Numeric and date data types are supported for join columns for enhanced band join evaluation. The inequality predicates can be more complicated than shown above as the case of type conversion operators applied on the join columns will be accommodated. Band join will be allowed only for inner join.

There may be more than one band join between any two tables. However, only one join will be utilized in the enhanced band join evaluation and the optimizer will pick the first band join detected between two tables. In other words, a query block may have multiple band joins. However, a table is allowed to participate in at most one band join.

The query optimizer will perform the detection of a band join. The tables in the band join will be marked. Further, the first table (left input T1) will be assigned a list, which will contain the second table (right input T2), the pair of band-join predicates, and the normalized values of the pair of bands B1 and B2. The second table T2 will be assigned a list that will contain the first table T1. The band join predicates will be marked. The pair of band join predicates will be used in the computation of the enhanced sort merge band join cardinality and cost.

The detection of band join will involve checking the validity of shapes, structures, and column data types of band join predicates as well as the type of join between the two tables.

When band join is detected, if there exists no equality predicate between current table and previously joined tables, it can be evaluated by nested-loop or sort-merge (with band join enhancement). The one with least estimated cost will be chosen.

Overlap Distribution

Processing performance may be improved by parallelizing the workload for an operation. Processing work may be parallelized by dividing the work into work granules and processing the work granules in parallel. Typically, work is divided and assigned to a number of slave processes during query initialization, the slave processes being coordinated by a process referred to as query coordinator. Various approaches for dividing workloads into work granules and generating an execution plan are described in U.S. application Ser. No. 10/824,887, entitled "Compilation and Processing a Parallel Single Cursor Model" and U.S. application Ser. No. 15/249,979, entitled "Efficient Hybrid Parallelization For In-Memory Scans".

To further enhance sort-merge for band join, a band join can be executed in parallel using a method called overlap distribution. Due to the properties of band join as described above, particularly, where a value from a column of a first table will only join with values of a column of a second table within a defined band, efficiency can be enhanced by providing a join distribution method called overlap distribution. Overlap distribution is value based, in that one of the join operands, e.g. R, is range distributed, and the other join operand, e.g. S, is range distributed but the range is overlapped. The purpose is to make sure that all the rows that can be joined with each other are sent to same process.

The overlapped ranges for S are decided based on the ranges of R and the band size (B1+B2). By overlapped range distributing S, it guarantees that given a slave process, for any row distributed to the slave process from R, all the rows that can join with it from S are also distributed to the same slave process.

Figure 2:
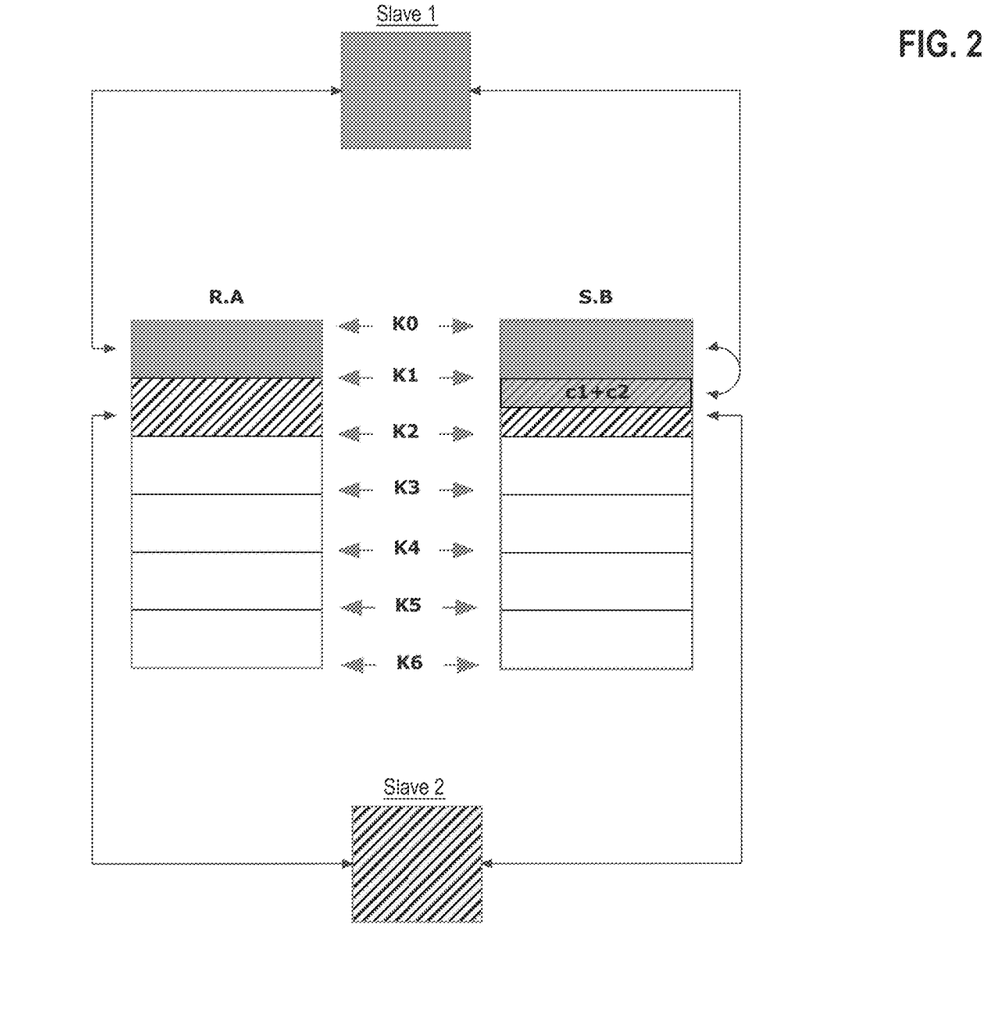
FIG. 2 is an illustration of overlap distribution according to an embodiment.

For example, FIG. 2 illustrates an overlap distribution for a band join between two tables S and R:

S.B between R.A−c1 and R.A+c2
 Or similarly translated to:
R.A−c1<=S.B and R.A+c2>=S.B.

Assume S.B>=R.A−c1 is picked as the sort-merge join key, and the join domain is divided into ranges of rows, and K0, K1, K2, K3, K4, K5, K6 denote the boundaries of each range of rows. When distributing ranges of rows to slave processes, range [K0, K1] from R.A and range [K0, K1+(c1+c2)] from S.B are distributed to the same slave process, Slave 1. Additionally, the portion of range [K1, K2] of S.B where c1+c2 is represented, [K1, K1+(c1+c2)], is also distributed to a second slave process, Slave 2, as part of the second range [K1, K2] that is distributed to a second slave processor. Thus, the distribution is overlapped, because a portion of rows identified by the band (c1+c2) from S.B is distributed to multiple slave processors in order to ensure the integrity of the parallelized band join.

Cardinality and Cost Estimate

An important aspect of the enhanced sort-merge band join is how to estimate cardinality and cost. Suitable techniques for evaluating a cost of a query execution plan are described, for instance, in U.S. Pat. No. 7,702,627, the entire contents of which are hereby incorporated by reference for all purposes as if fully set forth herein.

The following cost determinations may be useful for any particular query with a band join condition detected, such as a query executing a nested loop join.

A DBMS generates and stores the following statistics for a table:
 Total number of rows in a table (cardinality)
 Number of Distinct Values (NDV) per column (selectivity of a column is generally computed as 1/NDV)
 Lowest value of a column
 Highest value of a column The following calculations are based on the assumption that these values have a uniform distribution, meaning each value appears in equal numbers.

For a band join defined as: T1.c1>=T2.c2−B1 and T1.c1<=T2.c2+B2, the first step in estimating cardinality and cost requires an understanding of the ways of which two values can overlap. Generally, T1.c1 and T2.c2 can have sections of values, referred to as segments, which may or may not overlap. In the most extreme cases, the values of one table column may be completely overlapped by the values of the other table column, or the values of both table columns may not have any overlap.

Figure 3:
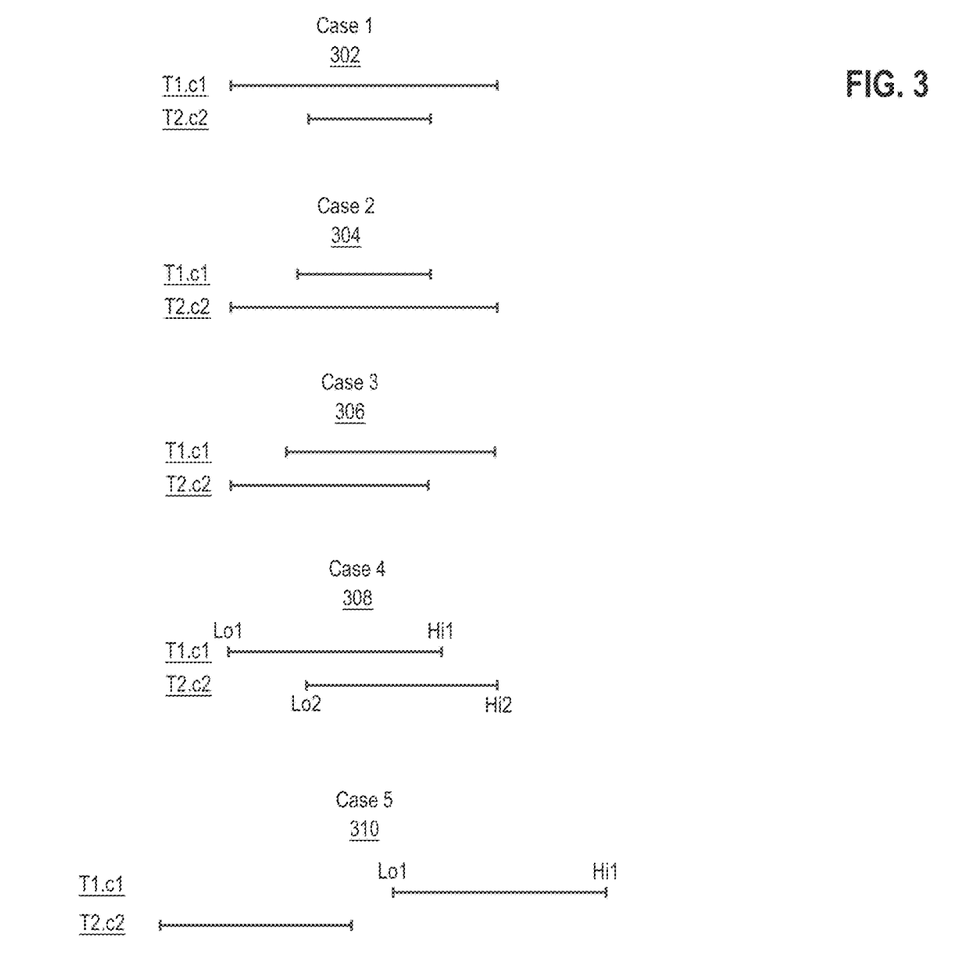
FIG. 3 is an illustration of various types of overlap between two band join key ranges according to an embodiment.

For example, four different types of overlap between the two band join key ranges are shown in FIG. 3 such as Case 1 302. Case 2 304. Case 3 306. Case 4 308, and Case 5 310.

Matching Segments in Overlap Case (Segmentation for Overlap)

Figure 4:
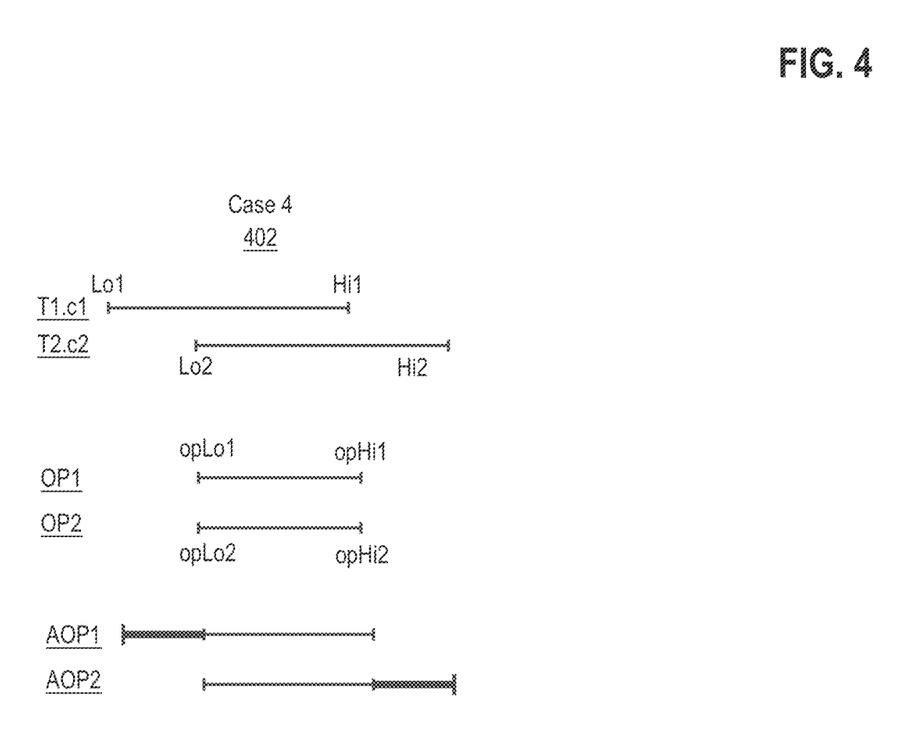
FIG. 4 is an illustration of overlapping and augmented segments for a particular overlap case according to an embodiment.

In the overlap case, such as Case 1 302, Case 2 304, Case 3 306, Case 4 308 from FIG. 3, matching segments can be computed by first determining the type of overlap based on high/low values and finding the high/low values of the overlaps. For example, as shown in FIG. 4, for T1.c1 and T2.c2 in Case 4 402, the first endpoint of the overlapping portion opLo is computed by taking the max of Lo1 and Lo2. The second endpoint of the overlapping portion opHi is computed by taking the min of Hi1 and Hi2. Note that the high/low values of OP1 and OP2 can be given by:

$$opLo1 = opLo2 = \text{Max}(Lo1, Lo2)$$

$$opHi1 = opHi2 = \text{Min}(Hi1, Hi2)$$

In the case where the sections of the table columns overlap, due to the band, segments of values are augmented, if required. In this case, augmentation refers to extending the segments of values for each table column. A table column will end at a certain point, but due to the inequality predicate, values of the table will match (join) with certain values that are smaller or larger because of the band.

For example, as shown in FIG. 4, Case 4 402 shows the portion of T1.c1 that is horizontally to the left of OP1 should match with T2.c2 due to the join predicate, T1.c1>=T2.c2−B1. The augmented overlap portion AOP for T1, called AOP1, and its high/low values are shown in FIG. 4. Assume that (opLo1−Lo1)>=B1.

Additionally, the portion of T2.c2 that is horizontally to the right of OP2 should match with T1.c1 due to the join predicate, T1.c1>=T2.c2−B1. The augmented overlap portion AOP for T2, called AOP2, and its high/low values are shown in FIG. 4. Assume that (Hi2−opHi2)<=B2.

Matching Segments in Non-Overlap Case (Segmentation for Non-Overlap)

In the case where there is no actual overlap between the values of table column, such as Case 5 310 from FIG. 3, in an equijoin, there are no matches between the values of each table. However, in a non-equijoin, because of the band there may be some values that join. For example, for the two tables in Case 5 310 as shown in FIG. 3, there are no overlapping portions between T1.c1 and T2.c2. In this case, assume that d<=B2, where the distances between the two join key ranges, d=Lo1−Hi2. That is, the distance between the segments must be less than the band in order for any match to occur. In this example, the segments in T1 and T2 that match are computed with the formulas:

$$S1=[Lo1, Lo1+(B2-d)]$$

$$S2=[Hi2-(B2-d), Hi2]$$

In the case where the band is smaller than the distance, d, between the segments, there will be no matches.

Computing Selectivity and Join Cardinality for Overlap

Once the ranges or segments that will match are identified, selectivity and join cardinality are computed.

For overlap, first determine the scaled number of distinct values, SNDV, by scaling down the number of distinct values (NDVs) originally computed for the entire table column to determine how many distinct values fall within each augmented overlapping portion, AOP1 and AOP2 from FIG. 4, using linear scaling.

Also determine the scaled cardinalities, SCard, of the two augmented overlapping portions, AOP1 and AOP2 from FIG. 4, using linear scaling.

Find the average count of bands within AOP2:

$$bandCount=(AOPHi2-AOPLo2)/(B1+B2)$$

Calculate inequality join cardinality:

$$ineqCard=(SCard(AOP1)-\text{repeat count 1})*(SCard(AOP2)-\text{repeat count 2})/\text{band count}$$

Where the repeat count identifies how many bands will fit in the particular AOP.

Calculate equality join cardinality (this becomes necessary only when the relational operators "<=" or ">=" are used in the band join predicates; if only "<" and ">" were used, this step will be skipped):

$$eqCard=(SCard(AOP1)*SCard(AOP2)/MAX(SNDV(AOP1), SNDV(AOP2))$$

Then calculate band join selectivity:

$$bandSel=(ineqCard+eqCard)/(Card(T1)*Card(T2))$$

Computing Selectivity and Join Cardinality for Non-Overlap

For non-overlap, first determine the scaled number of distinct values, SNDV, by scaling down the number of distinct values (NDVs) originally computed for the entire table column to determine how many distinct values fall within each segment, S1 and S2, using linear scaling.

Also determine the scaled cardinalities, SCard, of the two segments, S1 and S2, using linear scaling.

Calculate Inequality join cardinality (this becomes necessary only when the relational operators "<=" or ">=" are used in the band join predicates; if only "<" and ">" were used, this step will be skipped):

$$ineqCard=SCard(S1)-\text{repeat count 1})*(SCard(S2)-\text{repeat count 2})/2$$

Where the repeat count identifies how many bands will fit in the particular segment.

Calculate equality join cardinality:

$$eqCard=(SCard(S1)*SCard(S2)/Max(SNDV(S1), SNDV(S2)))$$

Then calculate band join selectivity:

$$bandSel=(ineqCard+eqCard)/(Card(T1)*Card(T2)))$$

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Software Overview

Figure 5:
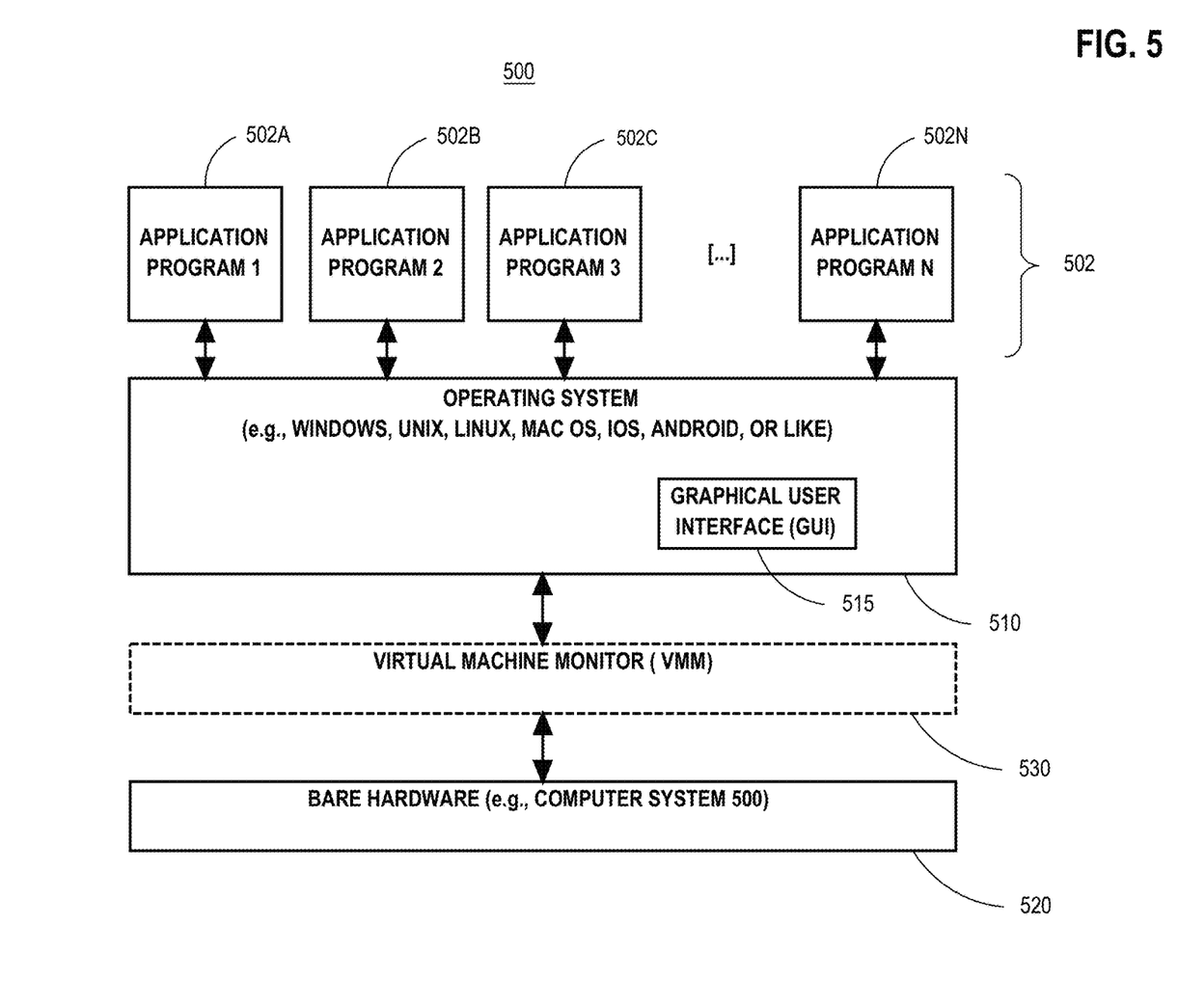
FIG. 5 is a block diagram of a basic software system that may be employed for controlling the operation of computing system 600 according to an embodiment.

FIG. 5 is a block diagram of a basic software system 500 that may be employed for controlling the operation of computing system 600 of FIG. 5. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
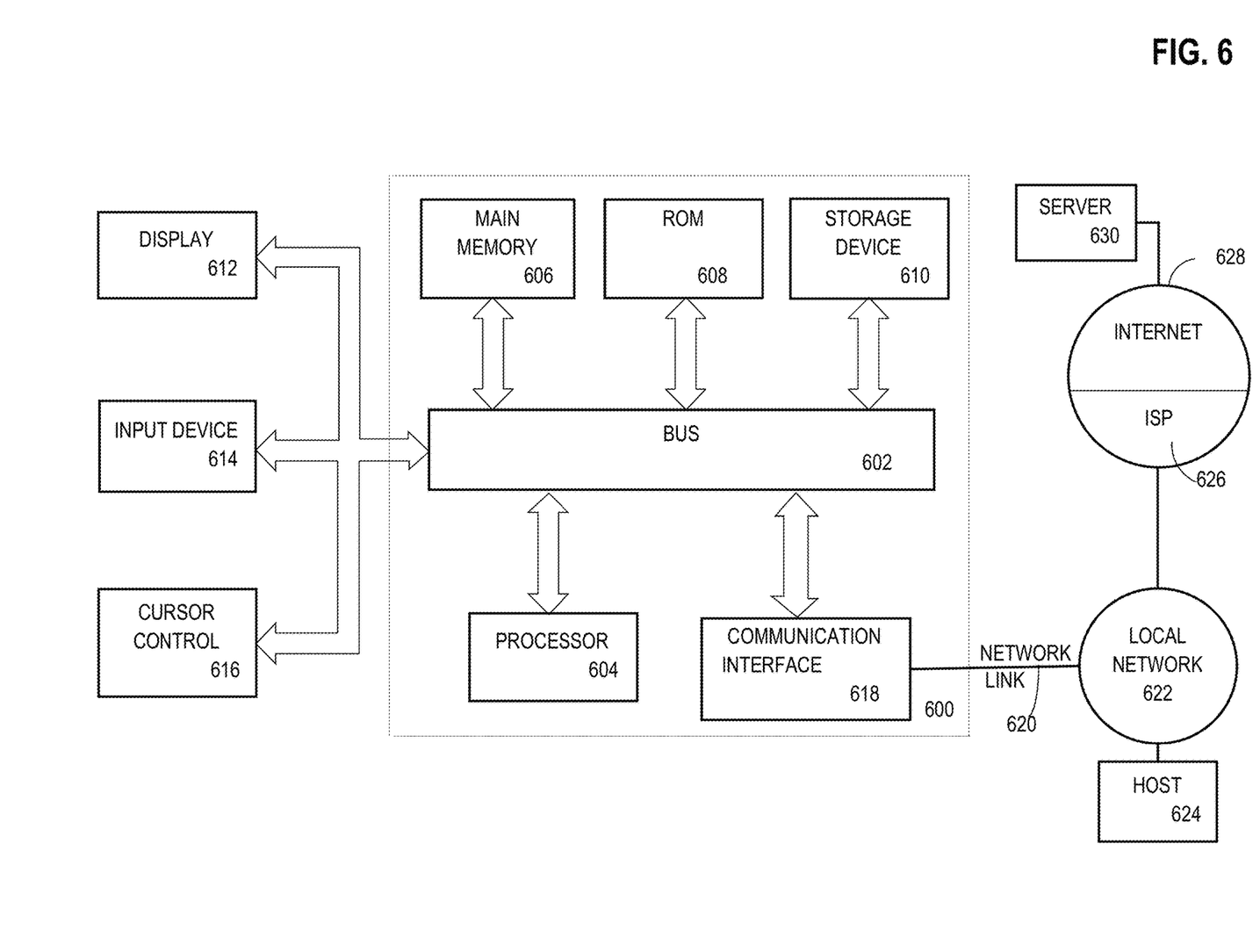
FIG. 6 depicts a computer system upon which an embodiment may be implemented according to an embodiment.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 46 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 46, or other non-volatile storage for later execution.

What is claimed is:

1. A method comprising:
    for a query comprising a query block specifying a join between a first table and a second table, detecting a band join condition between the first table and the second table;
    in response to detecting said band join condition between said first table and said second table, generating an execution plan;
    executing said execution plan, wherein executing said execution plan includes:
    for a first row of at least a subset of a set of first sorted rows, scanning second rows from a set of second sorted rows;
    joining each of said second rows with said first row;
    ceasing to scan when encountering a row from the second rows that falls outside a bound of said band join condition;
    wherein the method is performed by one or more computing devices.

2. The method of claim 1, wherein said band join condition includes an upper bound and a lower bound.

3. The method of claim 1, wherein said first table includes a first column and said second table includes a second column.

4. The method of claim 3, wherein the band join condition is satisfied when a value in the second column falls between a lower bound and an upper bound, wherein the lower bound and upper bound are based on a value in the first column.

5. The method of claim 1, wherein the execution plan comprises plan operators, wherein said plan operators include a first sort operator for sorting rows from said first table, a second sort operator for sorting rows from said second table, and a merge join operator for joining rows sorted by said first sort operator and said second sort operator.

6. The method of claim 5, wherein executing said execution plan includes:
executing said first sort operator thereby generating the set of first sorted rows;
executing said second sort operator thereby generating the set of second sorted rows;
executing said merge join operator thereby joining said set of first sorted rows with said set of second sorted rows.

7. The method of claim 1, wherein the bound of said band join condition comprises an upper bound.

8. The method of claim 1, further comprising:
partitioning the first table and the second table into a plurality of partitions that each comprise rows corresponding to a respective range of a plurality of ranges; and
executing the query by parallel computation by sending:
to a first slave process, a first pair of partitions of said plurality of partitions that correspond to a first range of said plurality of ranges;
to a second slave process, a second pair of partitions of said plurality of partitions that correspond to a second range of said plurality of ranges, wherein said second plurality of partitions includes a subset of rows from said second table;
to said first slave process, said subset of rows from said second table.

9. The method of claim 8, wherein the first table includes a first column that is partitioned and the second table includes a second column that is partitioned.

10. The method of claim 1, further comprising computing a cost for the query.

11. The method of claim 10, wherein computing a cost for the query includes:
determining that sections of values from the first table overlap with sections of values from the second table;
identifying overlapping portions of the sections of values from the first table that overlap with the sections of values from the second table;
augmenting the overlapping portions based at least in part on a band of said band join condition.

12. The method of claim 11, further comprising:
computing inequality join cardinality and equality join cardinality based at least in part on the augmented overlapping portions; and
computing band join selectivity based at least in part on the inequality join cardinality and equality join cardinality.

13. The method of claim 10, wherein computing a cost for the query includes:
determining that sections of values from the first table do not overlap with sections of values from the second table;
computing matching segments based at least in part on high and low values from: the sections of values from the first table and the sections of values from the second table.

14. The method of claim 13, further comprising:
computing inequality join cardinality and equality join cardinality based at least in part on the matching segments; and
computing band join selectivity based at least in part on the inequality join cardinality and equality join cardinality.

15. A non-transitory computer-readable storage medium storing sequences of instructions that, when executed by one or more processors, cause:
for a query comprising a query block specifying a join between a first table and a second table, detecting a band join condition between the first table and the second table;
in response to detecting said band join condition between said first table and said second table, generating an execution plan;
executing said execution plan, wherein executing said execution plan includes:
for a first row of at least a subset of a set of first sorted rows, scanning second rows from a set of second sorted rows;
joining each of said second rows with said first row;
ceasing to scan when encountering a row from the second rows that falls outside a bound of said band join condition.

16. The non-transitory computer-readable storage medium of claim 15, wherein said band join condition includes an upper bound and a lower bound.

17. The non-transitory computer-readable storage medium of claim 15, wherein said first table includes a first column and said second table includes a second column.

18. The non-transitory computer-readable storage medium of claim 17, wherein the band join condition is satisfied when a value in the second column falls between a lower bound and an upper bound, wherein the lower bound and upper bound are based on a value in the first column.

19. The non-transitory computer-readable storage medium of claim 15, wherein the execution plan comprises plan operators, wherein said plan operators include a first sort operator for sorting rows from said first table, a second sort operator for sorting rows from said second table, and a merge join operator for joining rows sorted by said first sort operator and said second sort operator.

20. The non-transitory computer-readable storage medium of claim 19, wherein executing said execution plan includes:
executing said first sort operator thereby generating the set of first sorted rows;
executing said second sort operator thereby generating the set of second sorted rows;
executing said merge join operator thereby joining said set of first sorted rows with said set of second sorted rows.

21. The non-transitory computer-readable storage medium of claim 15, wherein the bound of said band join condition comprises an upper bound.

22. The non-transitory computer-readable storage medium of claim 15, the sequences of instructions including instructions that, when executed by said one or more processors, cause:
partitioning the first table and the second table into a plurality of partitions that each comprise rows corresponding to a respective range of a plurality of ranges; and executing the query by parallel computation by sending:
- to a first slave process, a first pair of partitions of said plurality of partitions that correspond to a first range of said plurality of ranges;
- to a second slave process, a second pair of partitions of said plurality of partitions that correspond to a second range of said plurality of ranges, wherein said second plurality of partitions includes a subset of rows from said second table;
- to said first slave process, said subset of rows from said second table.

23. The non-transitory computer-readable storage medium of claim 22, wherein the first table includes a first column that is partitioned and the second table includes a second column that is partitioned.

24. The non-transitory computer-readable storage medium of claim 15, the sequences of instructions including instructions that, when executed by said one or more processors, cause computing a cost for the query.

25. The non-transitory computer-readable storage medium of claim 24, wherein computing a cost for the query includes:
- determining that sections of values from the first table overlap with sections of values from the second table;
- identifying overlapping portions of the sections of values from the first table that overlap with the sections of values from the second table;
- augmenting the overlapping portions based at least in part on a band of said band join condition.

26. The non-transitory computer-readable storage medium of claim 25, the sequences of instructions including instructions that, when executed by said one or more processors, cause:
- computing inequality join cardinality and equality join cardinality based at least in part on the augmented overlapping portions; and
- computing band join selectivity based at least in part on the inequality join cardinality and equality join cardinality.

27. The non-transitory computer-readable storage medium of claim 24, wherein computing a cost for the query includes:
- determining that sections of values from the first table do not overlap with sections of values from the second table;
- computing matching segments based at least in part on high and low values from: the sections of values from the first table and the sections of values from the second table.

28. The non-transitory computer-readable storage medium of claim 27, the sequences of instructions including instructions that, when executed by said one or more processors, cause:
- computing inequality join cardinality and equality join cardinality based at least in part on the matching segments; and
- computing band join selectivity based at least in part on the inequality join cardinality and equality join cardinality.

* * * * *